United States Patent [19]

Knetsch et al.

[11] Patent Number: 4,631,478
[45] Date of Patent: Dec. 23, 1986

[54] METHOD AND APPARATUS FOR USING SPRING-TYPE RESISTIVE ELEMENTS IN A MEASUREMENT BRIDGE CIRCUIT

[75] Inventors: Manfred Knetsch; Wolfgang Kühne, both of Stuttgart, Fed. Rep. of Germany

[73] Assignee: Robert Bosch GmbH, Stuttgart, Fed. Rep. of Germany

[21] Appl. No.: 421,173

[22] Filed: Sep. 22, 1982

[30] Foreign Application Priority Data

May 19, 1982 [DE] Fed. Rep. of Germany ....... 3218913

[51] Int. Cl.$^4$ .......................... G01B 7/14; H01F 21/02
[52] U.S. Cl. ..................................... 324/207; 336/20
[58] Field of Search .................. 336/20; 324/207, 208; 73/781

[56] References Cited

U.S. PATENT DOCUMENTS

| | | | |
|---|---|---|---|
| 2,367,576 | 1/1945 | Harvey et al. | 336/20 |
| 2,525,587 | 10/1950 | Cahn | 336/20 |
| 2,563,413 | 8/1971 | Ostrow | 336/36 |
| 2,564,416 | 8/1951 | Wildhach | 73/781 |
| 3,973,191 | 8/1976 | Zabler . | |
| 4,013,986 | 3/1977 | Wechenmann . | |
| 4,085,394 | 4/1978 | Weisenburger | 336/20 |

Primary Examiner—Ernest F. Karlsen
Assistant Examiner—Walter E. Snow
Attorney, Agent, or Firm—Edwin E. Greigg

[57] ABSTRACT

A method for converting a movement into an analog or digital variable, in particular into an electrical voltage, and an apparatus for performing the method are proposed. The apparatus includes at least one measuring spring element having windings and fabricated of electrically conductive material, which is disposed together with a supplementary spring element of identical structure and serving as a supplementary resistor in a bridge branch of a carrier-frequency measurement bridge. A deformation of the measuring spring element by a movement causes a change in the spacing between windings and thus causes a change in the inductive resistance of the measuring spring element which serves as a standard for the movement.

6 Claims, 9 Drawing Figures

METHOD AND APPARATUS FOR USING SPRING-TYPE RESISTIVE ELEMENTS IN A MEASUREMENT BRIDGE CIRCUIT

BACKGROUND OF THE INVENTION

The invention is based on a method and an apparatus for converting a movement into an analog or digital variable, in particular into an electrical voltage, which depends on the movement in accordance with an arbitrarily predetermined function, by means of at least one variable inductive measuring resistor located in an electrical current circuit.

In known apparatuses of this kind, a distance traveled is ascertained by disposing an electric coil in an electric evaluation circuit; a metallic member engages this coil in a manner that is more or less dependent on the movement, thus causing a change in induction.

OBJECT AND SUMMARY OF THE INVENTION

The method and apparatus according to the invention have the advantage over the prior art of a simple and inexpensive embodiment, and they permit the use of spring elements which at the same time perform other functions as well.

By means of the characteristics disclosed hereinafter, advantageous further developments of and improvements to the method and apparatus disclosed can be attained. It is particularly advantageous to embody the spring elements of at least two springs electrically connected in series with one another, and to dispose them either coaxially or in parallel with one another.

It is also advantageous to influence the characteristic curve of the apparatus in such a manner that a predetermined, desired function exists between the movement and the change in inductance; this is accomplished by embodying the windings of the spring element with different inclinations, or with a conical course.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
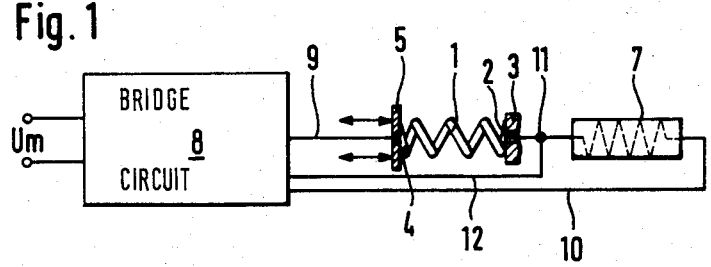
FIG. 1 shows a first exemplary embodiment of an apparatus according to the invention, in simplified form.

In FIG. 1, a compression spring is shown, embodied by way of example as a helical spring 1, one end 2 of which rests on a fixed support 3 and the other end 4 of which rests on a movable holder 5. The helical spring 1, embodied in accordance with the invention as a measuring spring element and fabricated of electrically conductive material, serves as an active inductive measuring resistor in an electrical measurement bridge. To this end, the measuring spring element 1 is disposed, together with a supplementary resistor 7, in a bridge branch which is supplied with current by a carrier-frequency measurement bridge 8 of known design (available, for example, from the Hottinger Company). For this purpose, the end 4 of the measuring spring element 1 is connected via an electric line 9 to the carrier-frequency measurement bridge 8, which operates at a frequency of 50 kHz, for example, and the end of the supplementary resistor 7 remote from the end 2 of the measuring spring element 1 is connected via an electric line 10 to the measurement bridge 8. The end 2 of the measuring spring element 1 and the supplementary resistor 7 in series with it are linked with a nodal point 11, which is likewise connected to the carrier frequency measurement bridge 8 via a line 12. The supplementary resistor 7 is advantageously embodied by a supplementary spring element shown in dashed lines, which is identical in structure to the measuring spring element 1.

An axial displacement of the movable holder 5 causes a change in the length of the measuring spring element 1 and thus causes an imbalancing of the measurement circuit, because with a variation in the spacing of the windings of the measuring spring element 1, its inductive resistance varies as well. Thus, by changing the length of the measuring spring element 1, the mechanical change in distance traveled by the holder 5, which is indicated by arrows, effects an imbalancing of the measurement circuit, which is applied in the form of an electrical voltage $U_m$ to the output of the carrier-frequency measurement bridge 8 as a standard of the change in distance traveled. The measuring spring element 1 may be embodied as either a compression spring or a tension spring. The measurement voltage $U_m$ can also serve as a standard for a force which engages the holder 5 and, depending on the stiffness of the spring, effects a predetermined change in the length of the measuring spring element.

Figure 2:
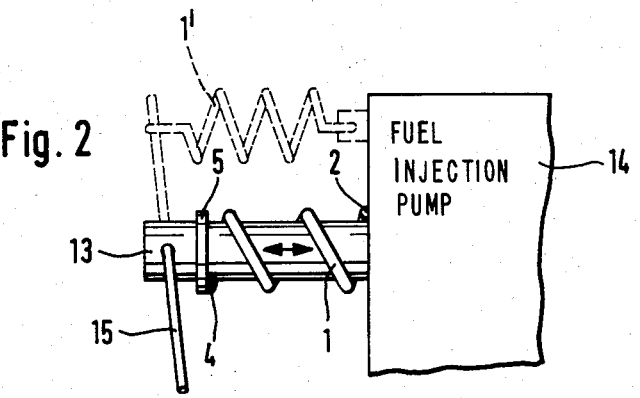
FIG. 2 shows an example of an application of an apparatus according to the invention in a fuel injection pump.

An example of an application of the invention is shown in schematic form in FIG. 2. Here, a governor of known design engages a governor rod 13 of a known fuel injection pump 14 via a lever 15. For purposes of compensating for play, for example, a compression spring 1 embodied as a helical spring is disposed on the governor rod 13, the spring 1 being supported with one end 2 on the housing of the injection pump 14 and with its other end 4 on a holder 5, which is secured on the governor rod 13 and follows the displacement movement of the governor rod 13. As shown by dashed lines at 1', a tension spring could equally well be secured at one end to the housing of the injection pump 14 and engage the lever 15 at the other end, which would be particularly applicable in the case of an idling spring. If the measuring spring element 1 or 1' corresponding to the embodiment of FIG. 1 is now connected to an electrical measuring circuit, then when there is a displacement movement of the governor rod 13, a change in inductance of the measuring spring element 1, 1' occurs, and a measurement voltage $U_m$ can be picked up at the output of the carrier-frequency measurement bridge 8; this measurement voltage has a predetermined relationship with the position of the governor rod 13.

Figure 3:
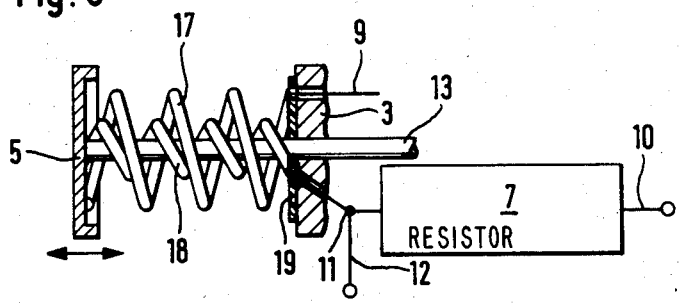
FIG. 3 shows a second exemplary embodiment of an apparatus according to the invention.
Figure 4:
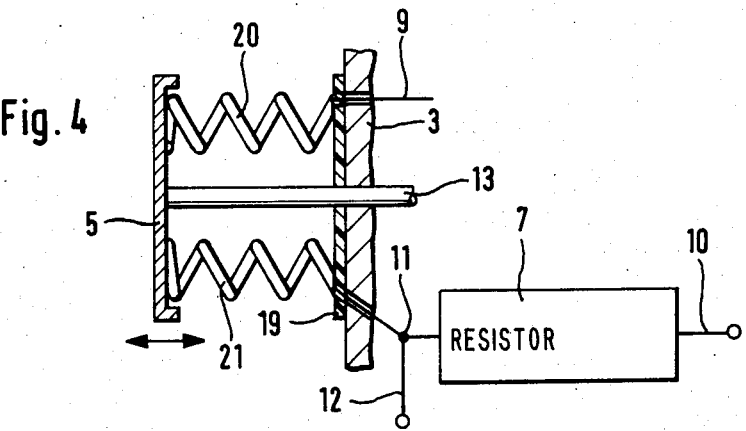
FIG. 4 shows a third exemplary embodiment of an apparatus according to the invention.

In order to attain an amplification of the measurement signal by increasing the number of windings, it may be advantageous to embody the measuring spring element of at least two measuring springs electrically connected in series with one another. As shown in FIG. 3, one measuring spring element 17 and one measuring spring element 18 can be disposed coaxially with one another, one end of each measuring spring element 17, 18 being supported on a movable, electrically conductive holder 5 and the other end being supported on a support 3 provided with an insulation 19. The measuring spring elements 17, 18 are then incorporated into the electrical measuring circuit of FIG. 1 in place of the measuring spring element 1 shown.

The measuring spring element may likewise be realized in that at least two measuring spring elements 20, 21 are disposed such that they are electrically conductive and in series with one another but spatially extend parallel to one another; they are supported at one end on the electrically conductive, movable holder 5 and at the other end on the fixed support 3 via an insulation 19 and are incorporated into an electrical measuring circuit as shown in FIG. 1 in place of the measuring spring element 1. The supplementary resistors 7 are then advantageously embodied as supplementary spring elements of identical structure with the measuring spring elements.

Figure 5:
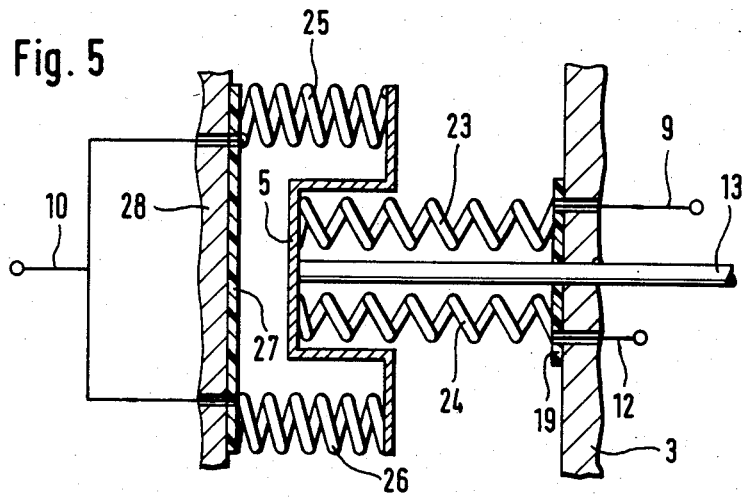
FIG. 5 shows a fourth exemplary embodiment of an apparatus according to the invention.

A further increase in measurement sensitivity can be attained by means of the exemplary embodiment shown in FIG. 5. Here, one spring element 23, embodied by way of example as a compression spring, and one spring element 24, also embodied as a compression spring, are disposed parallel to one another and engage a fixed support 3 via an insulation 19, while with their other ends the spring elements 23, 24 engage the movable holder 5, which is embodied such that it is electrically conductive. Remote from the spring elements 23, 24, two spring elements 25, 26 disposed parallel to one another and embodied as tension springs engage the holder 5; the other ends of these spring elements 25, 26 engage a fixed support 28 and are connected with the line 10. The spring elements 23, 24 then serve as measuring spring elements and the spring elements 25, 26 serve as supplementary spring elements, or vice versa. The end of the spring element 23 remote from the holder 5 is connected with the line 9, and the end of the spring element 24 remote from the holder 5 is connected with the line 12, or vice versa.

Figure 6:
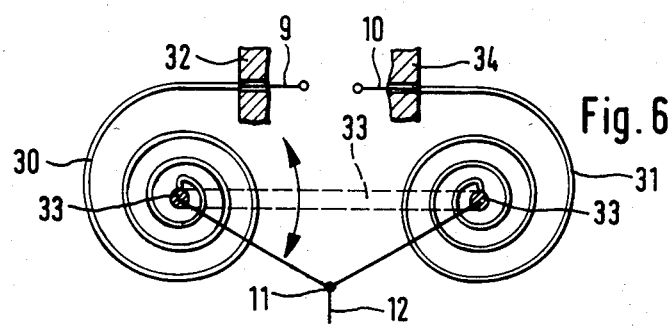
FIG. 6 shows a fifth exemplary embodiment of an apparatus according to the invention.

In the exemplary embodiment of the invention shown in FIG. 6, a measuring spring element 30 and a supplementary spring element 31 are each embodied as spiral springs. One end of the measuring spring element 30 is secured on a fixed support 32, while a rotatable holder 33 engages the other end of the measuring spring element 30. In order to double the sensitivity and to linearize the measurement signal $U_m$, it may be efficacious to realize the supplementary spring element 31 as identical in structure to the measuring spring element 30 but would in the opposite direction, and to connect one end of the supplementary spring element 31 with the holder 33 and the other end with a fixed support 34. Upon a rotational movement of the holder 33 in a direction which tensed the measuring spring element 30, the supplementary spring element 31 would relax and vice versa. If the measuring spring element 30 and supplementary spring element 31 were disposed in a measurement circuit of FIG. 1, then the measurement signal $U_m$ would thus represent a standard for an angular movement (rotational movement). If the measuring spring element 30 and the supplementary spring element 31 are disposed in opposite directions on the holder 33, the holder 33 can be embodied in an electrically conductive manner.

Figure 7:
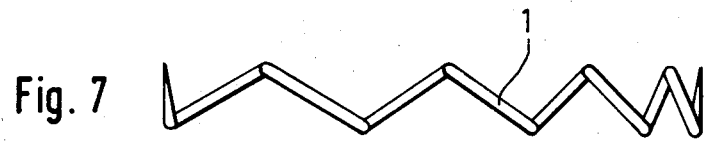
FIGS. 7-9 show realizations of the spring elements of the apparatus for influencing the measurement result.
Figure 8:

In order to influence the measurement signal $U_m$, various forms of measuring spring elements or supplementary spring elements can be selected. For instance, as shown in FIG. 7, the measuring spring element 1 can be wound in progressive fashion, so that the windings have different inclinations. As shown in the embodiment of FIG. 8, the measuring spring element 1 could furthermore be wound in conical fashion.

Figure 9:
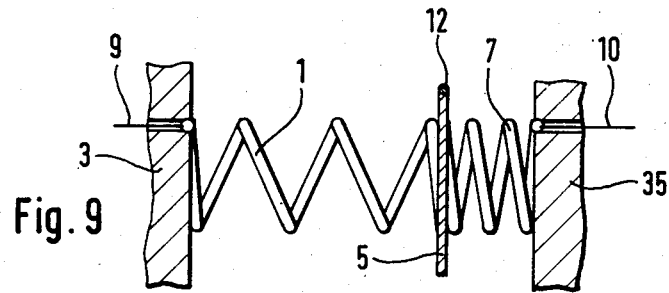

The realization shown in FIG. 9 shows a further advantageous embodiment of the invention, in which the measuring spring element 1 is supported on one end on the fixed support 3 and on the other end on the movable, electrically conductive holder 5, which is engaged on its other side by the supplementary spring element 7, which is in turn secured with its other end on the fixed support 35. One of the spring elements 1, 7 is then embodied as a compression spring, and the other of the spring elements 1, 7 is embodied as a tension spring.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. An apparatus for converting a movement into a variable electrical voltage, which depends on the movement in accordance with an arbitrarily predeterminable function, and having at least one variable inductive measuring resistor located in an electrical current circuit, said resistor comprising a measuring spiral spring including an electrically conductive helix said measuring spiral spring being connected to a holder means and arranged to extend in a single plane and to exhibit rotational movement about the center of said measuring coil within said plane, said holder means being rotatable selectively to increase and decrease tension in said measuring spiral spring, and said spiral spring further is connected to a means for measuring rotational movement of said holder means as a function of said variable electrical voltage.

2. An apparatus as defined by claim 1, further comprising a supplementary spring element acting as a supplementary resistor, and wherein said measuring and supplementary spring elements comprise an angle measuring means.

3. An apparatus for converting a movement into a variable electrical voltage, said variable electrical voltage depending on the movement in accordance with an arbitrarily predeterminable function, and having at least one variable inductive measuring resistor located in an electrical current circuit, said resistor comprising a first measuring spring element serving as an active measuring resistor and disposed in an electrical measurement bridge, said spring element being fabricated of an electrically conductive helix of a spiral coil, said spiral coil being arranged to extend in a single plane and to exhibit rotational movement about the center of said coil within said plane, and said electrical measurement bridge further including a supplementary resistor comprising a second spring element disposed electrically in series in one branch of said bridge with said first spring element, whereby a change in spacing between said windings of said helix effects a change in inductive resistance in said first measuring spring element, said change in inductive resistance serving to measure said movement.

4. An apparatus as defined by claim 3, wherein the electrical measurement bridge comprises a carrier frequency bridge.

5. An apparatus as defined by claim 3, wherein said measuring spring element comprises a compression spring and said supplementary spring element comprises a tension spring.

6. An apparatus as defined by claim 3, wherein said holding means engaged by said measuring spring element and said supplementary spring element is electrically conductive.

* * * * *